United States Patent
Küng

(10) Patent No.: US 9,468,049 B2
(45) Date of Patent: Oct. 11, 2016

(54) OPERATING CIRCUIT FOR LEDS, HAVING VOLTAGE MEASUREMENT

(71) Applicant: Tridonic GmbH & Co. KG, Dornbirn (AT)

(72) Inventor: Thomas Küng, Nidfurn (CH)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 14/785,990

(22) PCT Filed: Apr. 25, 2014

(86) PCT No.: PCT/AT2014/000086
§ 371 (c)(1),
(2) Date: Oct. 21, 2015

(87) PCT Pub. No.: WO2014/172728
PCT Pub. Date: Oct. 30, 2014

(65) Prior Publication Data
US 2016/0073456 A1    Mar. 10, 2016

(30) Foreign Application Priority Data

Apr. 25, 2013  (DE) .................. 10 2013 207 562

(51) Int. Cl.
*H05B 33/08*     (2006.01)

(52) U.S. Cl.
CPC ...... *H05B 33/0815* (2013.01); *H05B 33/0818* (2013.01); *H05B 33/0848* (2013.01); *Y02B 20/346* (2013.01)

(58) Field of Classification Search
None
See application file for complete search history.

(56) References Cited

U.S. PATENT DOCUMENTS

| | | | |
|---|---|---|---|
| 5,903,447 A | 5/1999 | Takahashi et al. | |
| 2010/0039836 A1 | 2/2010 | Gong et al. | |
| 2010/0259180 A1* | 10/2010 | Ren ................... | H05B 33/0818 315/224 |
| 2012/0281438 A1 | 11/2012 | Fang et al. | |
| 2013/0207555 A1* | 8/2013 | Qiu .................... | H05B 33/0815 315/186 |

FOREIGN PATENT DOCUMENTS

JP     2002050935 A  *  2/2002

OTHER PUBLICATIONS

International Search Report issued in connection with International Application No. PCT/AT2014/000086 on Mar. 4, 2015.

* cited by examiner

*Primary Examiner* — Dedei K Hammond
(74) *Attorney, Agent, or Firm* — The H.T. Than Law Group

(57) ABSTRACT

The invention relates to an operating circuit for an LED series, having: a converter, particularly a DC-DC converter, having a controllable switch (S1) and an inductor ($L_{BUCK}$) for converting an input voltage (Vin) fed to the operating circuit into a supply voltage for the LED series; —a control unit (SR) for driving the switch (S1); —a secondary-side inductor (L2) coupled to the inductor (LBUCK); —an envelope curve demodulator (30) for detecting the envelope curve of the voltage (V'LED) present at the secondary-side inductor (L2); and—a compensating circuit (31) for compensating an error caused by the envelope curve demodulator (30) relating to the detection of the envelope curve.

14 Claims, 2 Drawing Sheets

OPERATING CIRCUIT FOR LEDS, HAVING VOLTAGE MEASUREMENT

FIELD OF THE INVENTION

The present invention relates to a circuit for operating light-emitting diodes (LEDs) by means of switching regulators or respectively converters for supplying an operating voltage or respectively an operating current for the LEDs.

BACKGROUND OF THE INVENTION

The use of a step-down converter, also referred to as a buck-converter, for the control of LEDs is known in principle. As shown in FIG. 1, a switch S1 is closed and opened in alternation, wherein, in its activated condition, a coil $L_{Buck}$ is energised. In turn, in the deactivated condition of the switch S1, the energy accumulated in the coil $L_{Buck}$ is discharged via the LED system.

The switch S1 is clocked by a control unit (not shown). This control unit monitors the current through the switch S1 during the activation phase of the switch S1 via a measuring resistor $R_{SHUNT}$ connected in series to the switch S1. As soon as the voltage which is picked up via the measuring resistor $R_{SHUNT}$ reaches a given maximal value, the switch S1 is opened.

Furthermore, an indirect detection of the voltage $V_{LED}$ across the LED system is provided. The voltage detection is implemented in the freewheeling phase of the switch S1, that is, when the switch S1 is open, that is, not conducting, wherein, in this phase, a current flows through the LED system, a diode D2 and the coil $L_{Buck}$ embodied as the primary side of a transformer T1.

FIG. 2 shows the characteristic of electrical parameters from the circuit according to FIG. 1. With closed switch S1, the following equation applies for the voltage $V'_{LED}$ across the secondary side L2 of the transformer T1:

$$V'_{LED} = (VIN - V_{LED})/r$$

wherein VIN denotes the input voltage of the step-down converter, and r denotes the transformer ratio of the transformer T1.

During the freewheeling phase, the following equation once again applies approximately:

$$V'_{LED} = V_{LED}/r$$

According to the prior art, the coil $L_{Buck}$ is embodied as a primary winding of the transformer T1, wherein the secondary winding L2 of the transformer T1 serves for the indirect detection of the voltage $V_{LED}$ across the LED system. Accordingly, a secondary winding L2 is coupled to the primary winding $L_{Buck}$, by means of which the LED voltage can be measured in the freewheeling phase of the switch S1, because the LED voltage is fully present across this primary winding $L_{Buck}$ in the freewheeling phase.

The secondary winding L2 is connected, on the one hand, to ground and, on the other hand, to a resistor $R_{CHG}$. An envelope-curve demodulator comprising a diode D1, a capacitor C1 and a resistor $R_{DISCHG}$ are connected in series to this resistor $R_{CHG}$. These three components form an envelope-curve demodulator for the voltage $V'_{LED}$ of the secondary winding L2. The diode D1 allows only one polarity of the high-frequency voltage $V'_{LED}$ to pass. The parallel configuration of the capacitor C1 and of the resistor $R_{DISCHG}$ forms a low-pass filter for the removal of the high-frequency signal. The corresponding characteristic of the voltage $V_{ADC}$ present in this low-pass filter or respectively in the envelope-curve demodulator is shown in FIG. 2.

It is already known that this voltage $V_{ADC}$ is supplied to the control unit in order to determine the activation time of the switch S1. More particularly, the voltage $V_{ADC}$ reproduces the voltage $V_{LED}$ across the LED system during the freewheeling phase of the switch S1, wherein the transformer ratio r and the voltage $V_F$ across the diode D1 must then also be taken into consideration. This diode voltage $V_F$ depends upon the current through the diode D1. Since the current through the diode D1 declines almost to zero with a charged capacitor C1, the diode voltage $V_F$ is dependent upon the deactivation duration of the switch S1.

The transformer T1 and the capacitor C1 together form a resonant circuit which, in turn, can cause harmonics or respectively electromagnetic disturbances. Furthermore, the fact that the envelope-curve demodulator comprising the diode and the low-pass filter provides a temperature-dependent and operating-point-dependent voltage error is also problematic. As a result, considerable measurement errors occur, which cannot be corrected.

SUMMARY OF THE INVENTION

The invention is therefore based upon the object of providing a correspondingly improved operating circuit for at least one LED and a method for operating at least one LED.

The object is achieved by the features of the independent claims. The dependent claims develop the central idea of the invention further in a particularly advantageous manner.

According to the invention, an operating circuit for an LED system is proposed, comprising a converter, more particularly a DC voltage converter, with a controllable switch and an inductor for converting an input voltage supplied to the operating circuit into a supply voltage for the LED system. The operating circuit comprises a control unit for controlling the switch, a secondary-side inductor coupled to the inductor, and an envelope-curve demodulator for detecting the envelope curve of the voltage present in the secondary-side inductor. A compensation circuit is provided in order to compensate an error relating to the detection of the envelope curve caused by the envelope-curve demodulator.

By preference, a temperature-dependent and/or operating-point-dependent voltage error caused by the envelope-curve demodulator can be counteracted by means of the compensation circuit.

By preference, the envelope-curve demodulator can comprise a first diode for rectification of the voltage present in the secondary-side inductor. The compensation circuit can comprise a second diode for compensation of a detection error caused by the diode.

By preference, both diodes can be arranged in such a manner that the second diode counteracts an offset voltage introduced by the first diode.

By preference, the second diode can compensate the temperature dependence of the first diode in that both diodes preferably comprise an identical or similar temperature dependence of the forward voltage.

By preference, the first diode and the second diode can be of identical construction, preferably Schottky diodes.

By preference, the compensation circuit can comprise an operational amplifier at the positive input of which the output voltage of the envelope-curve demodulator is connected and to the negative input of which the second diode is connected.

By preference, the envelope-curve demodulator can comprise a low-pass filter.

By preference, a capacitor can be connected upstream of the envelope-curve demodulator in order to counteract an oscillation of the current flowing through the inductor caused by a resonance circuit comprising the secondary-side inductor.

By preference, a level-matching circuit can be connected downstream of the compensation circuit.

By preference, the secondary-side inductor, the envelope-curve demodulator and the compensation circuit can form a sensor unit for detecting the voltage present in the inductor.

By preference, the control unit can control the switch dependent upon the envelope curve of the voltage present in the secondary-side inductor.

By preference, starting from the envelope curve of the voltage present in the secondary-side inductor, the control unit can therefore infer the voltage present in the LED system or in the inductor and control the switch.

According to the invention, a lamp is provided, comprising a lighting means, more particularly an LED system and such an operating circuit.

Further properties, advantages and features are now presented for the person skilled in the art on the basis of the following extensive description of the invention and with reference to the drawings accompanying the FIGS.

DETAILED DESCRIPTION OF THE PREFERRED EMBODIMENTS

Figure 1:
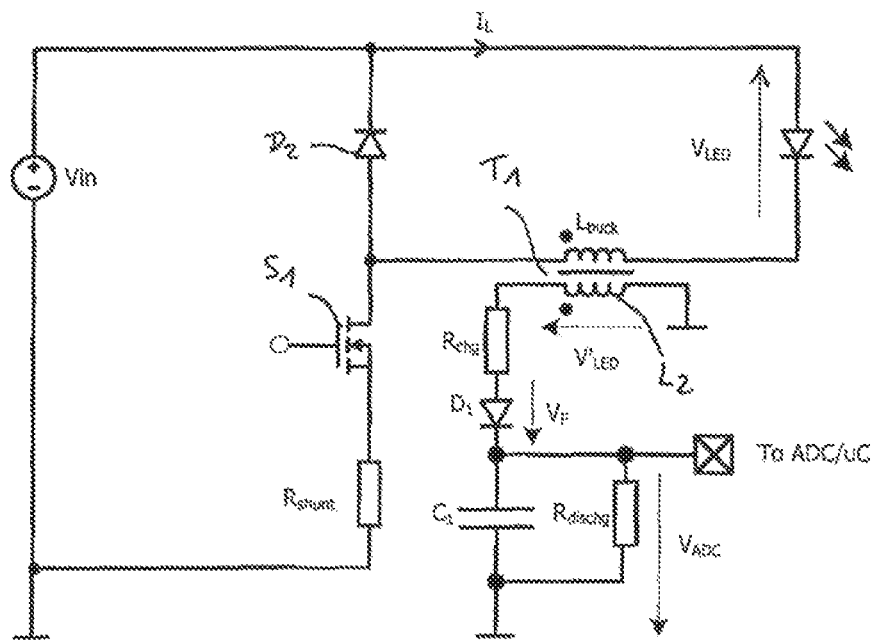
FIG. 1 shows a circuit arrangement according to the prior art.
Figure 2:
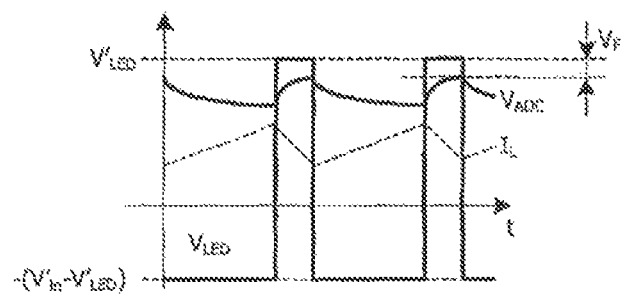
FIG. 2 shows a diagram with the time characteristic of electrical parameters according to the prior art.
Figure 3:
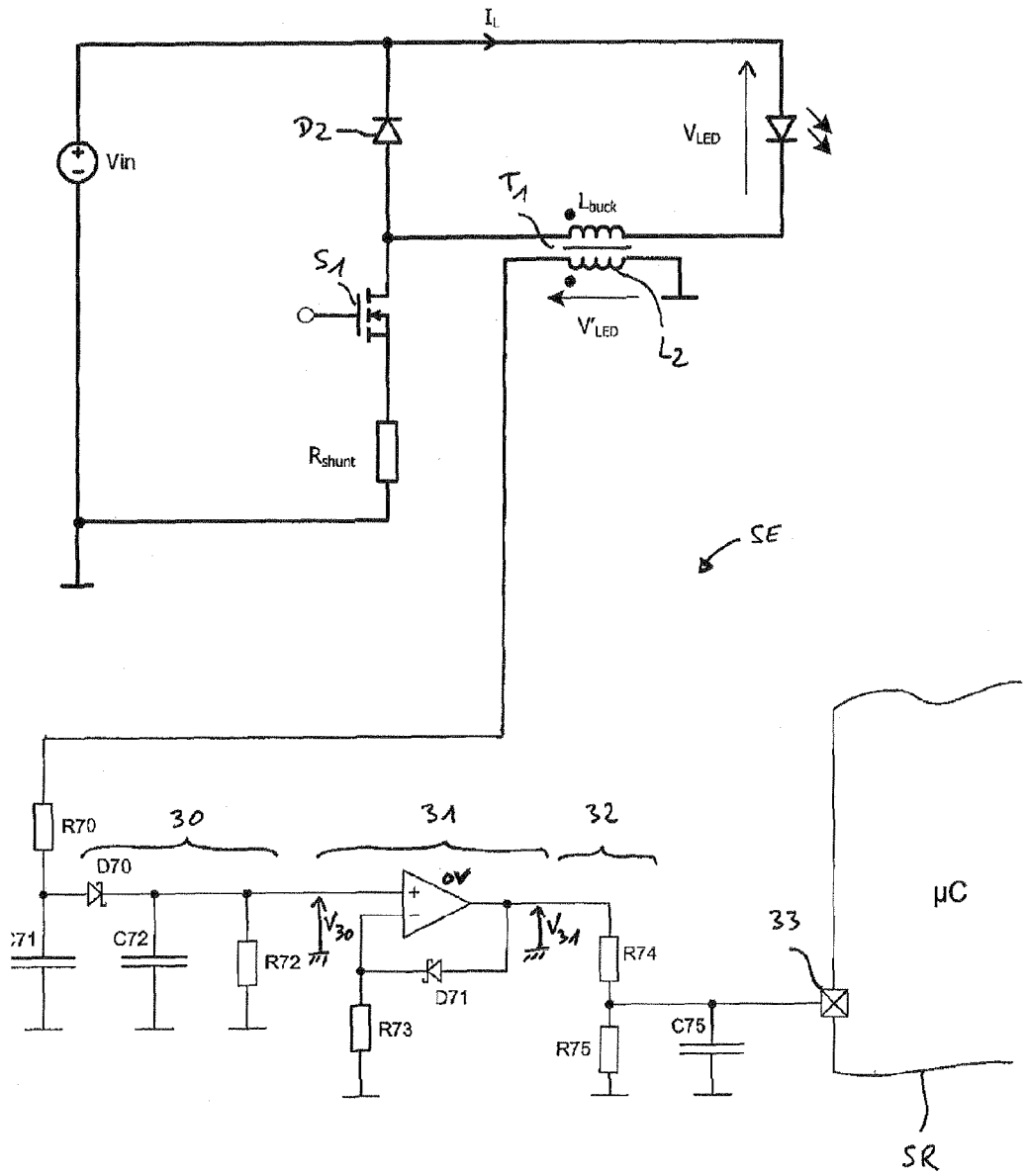
FIG. 3 shows a schematic presentation of an exemplary embodiment of the operation according to the invention of an LED system.

The schematic circuit arrangement illustrated in FIG. 3 serves for the operation of at least one LED or respectively one LED system. In the illustrated exemplary embodiment, one LED is provided. Of course, several series connected and/or parallel connected LEDs can also be operated by the circuit arrangement. The LED or respectively the several series connected and/or parallel connected LEDs form a so-called LED system.

An input voltage Vin is supplied to the circuit, which can be a previously rectified alternating voltage or respectively mains voltage, preferably processed by a power-factor correction circuit.

As an alternative to a pulsed, rectified alternating voltage, the input voltage Vin can also be a constant voltage, for example, supplied from a battery. Such a constant voltage originating from a battery is provided, for example, in an emergency lighting device.

The LED system is connected in series to an inductor $L_{Buck}$ and a switch S1. Furthermore, the circuit arrangement provides a diode D2, which is connected in parallel to the LED system and to the inductor L1. The cathode of the diode D2 is connected to the anode of the LED or respectively to the anode of at least one LED of the LED system. The anode of the diode D2 is connected in turn to the connecting point between the inductor $L_{Buck}$ and the switch S1. In parallel with the LED system, a capacitor (not shown) can be connected. The input voltage Vin is applied at the connecting point between the diode D2 and the LED system.

The switch S1 is closed and opened in an alternating manner by a control unit or respectively a control-regulation unit SR. The control unit SR can preferably be embodied as an integrated circuit, more particularly an ASIC or microcontroller or a hybrid version of these.

In the closed condition of the switch S1, a current $I_L$ flows through the LED system, the inductor $L_{Buck}$ and the switch S1, so that the inductor $L_{Buck}$ is charged. In the deactivated condition of the switch S1, this energy stored in the magnetic field of the inductor $L_{Buck}$ is discharged in the form of a current $I_L$ via the diode D2 and the LED system.

A transistor in the form of a field-effect transistor or also a bipolar transistor is preferably used as the switch S1. The switch S1 is switched by the control unit SR with high-frequency, typically within a frequency range above 10 kHz.

For regulation of the power supplied to the LED system or respectively for regulation of the current supplied to the LED system, the control unit SR specifies the clocking of the switch S1. In order to specify the standardised deactivation time of the switch S1, the control unit SR uses, for example, a sensor unit in the form of a measuring resistor $R_{SHUNT}$, which is connected in series to the switch S1, preferably between the switch and the ground. The voltage picked up from the measuring resistor $R_{SHUNT}$ serves to monitor the current flow through the switch S1. Correspondingly, the control unit SR can deactivate the switch S1 when the current flow through the switch S1 reaches or exceeds a given maximal value.

In order to specify the deactivation duration of the switch S1 or respectively to specify the time of reactivation of the switch S1, a further sensor unit SE is required within the current branch through which current flows during the freewheeling phase.

According to the exemplary embodiment of FIG. 3, such a sensor unit SE comprises a secondary winding L2 which is coupled to the inductor $L_{Buck}$. More particularly, the inductor $L_{Buck}$ can form the primary winding of a transformer T1, which, in turn, comprises the secondary winding L2 on the secondary side. Through this secondary winding L2, the magnetisation condition of the inductor $L_{Buck}$ can be detected or respectively, taking into consideration the transformer ratio r of the transformer T1, the voltage in the inductor $L_{Buck}$ can be detected. This can serve for indirect detection of the voltage $V_{LED}$ across the LED system.

In turn, in a known manner, monitoring the time-voltage characteristic in the inductor $L_{Buck}$ provides information regarding the advantageous reactivation time of the switch S1.

The circuit arrangement shown in FIG. 3 is based upon a step-down converter, also referred to as a buck converter. As an alternative, other circuit topologies can be used, wherein, more particularly, an inductor is used as an energy transferring component, for example, in the case of a step-up converter or boost converter, in the case of an inverse converter or buck-boost converter, or in the case of a flow-through converter or forward converter. The inductor used in these alternative topologies and acting as an energy-transferring component corresponds to the inductor $L_{Buck}$ shown in FIG. 3 and is coupled, in turn, to the secondary-side inductor L2 shown in FIG. 3.

The switch S1 can be controlled in such a manner that the control unit SR determines the duration between a deactivation and a subsequent activation of the switch S1 dependent upon the voltage $VL_{Buck}$ across the inductor $L_{Buck}$. In this context, the control unit SR will preferably determine the voltage across the inductor $L_{Buck}$ by means of the secondary winding L2 coupled inductively or respectively by transformer to the inductor $L_{Buck}$, because $VL_{Buck}=V'_{LED}\cdot r$.

As described in the introduction, the following equations are preferably obtained for the voltage $V'_{LED}$ across the secondary-side inductor L2:

$V'_{LED}=-(VIN-V_{LED})/r$, with closed switch S1, and $V'_{LED}=V_{LED}/r$, with open switch S1.

In a corresponding manner, the sensor unit SE can be used to control the switch S1 during the activation duration and during the deactivation duration of the switch S1.

During the deactivation phase of the switch S1, the diode D2 is connected through, that is, in a conducting condition, so that only a negligible voltage of approximately 0.7 V is released across it. The voltage across the inductor $L_{Buck}$ differs from the voltage $V_{LED}$ across the LED system only through this voltage released across the diode D2. Accordingly, it is possible to infer the voltage across the LED system either ignoring or considering this voltage released across the diode D2.

The sensor unit SE which is connected at the output end to a Pin or respectively input 33 of the control unit SR, comprises further components in addition to the secondary winding L2, and in fact, preferably a resistor R70, an input-end capacitor C71, an envelope-curve demodulator 30, a compensation circuit 31, a level-matching circuit 32 and an output-end capacitor C75.

Initially, a resistor R70 is provided, which is arranged in series to the secondary winding L2, wherein the other connection of the secondary winding L2 is connected to ground. The output connection of the resistor R70 is connected to the envelope-curve demodulator 30, namely to the anode of a diode D70 of the envelope-curve demodulator 30.

The envelope-curve demodulator 30 is formed by the diode D70, a capacitor C72 and a resistor R72. The cathode of the diode D70 is connected respectively to a connection of the capacitor C72 and of the resistor R72, wherein the capacitor C72 and the resistor R72 are arranged in parallel to the cathode of the diode D70 and ground.

The diode D70 is preferably a rectifier diode. Accordingly, it only allows a polarity of the preferably high-frequency voltage $V'_{LED}$ to pass. The diode D70 is suitable for converting the voltage $V'_{LED}$ into a DC voltage. The arrangement of the capacitor C72 and of the resistor R72 ensures that the output voltage V30 of the envelope-curve demodulator 30 follows the envelope curve of the voltage rectified by the diode D70. The combination of capacitor C72 and resistor R72 forms a low-pass filter.

A capacitor C71 is connected to the input of the envelope-curve demodulator 30. This capacitor C71 is connected, at one end, to ground and, at the other hand, to the connecting point between the resistor R70 and the envelope-curve demodulator 30.

The use of the further capacitor C71 reduces an oscillation of the detected LED current which could occur as a result of a resonance circuit comprising the secondary winding L2. Together with the secondary winding L2 and the resistor R70, the capacitor C71 forms an oscillation circuit in the form of a series resonance circuit, wherein the capacitor C71 preferably adjusts this oscillation circuit to a critical oscillation absorption in such a manner that harmonics or respectively electromagnetic disturbances in the LED current are avoided. By preference, the capacitor C71 attenuates harmonics which are generated by the resonant circuit comprising the secondary winding L2 and the capacitor C72. The risk of an oscillation in the secondary winding L2 is preferably attenuated by the resistor R70.

Through its forward voltage or respectively flow voltage, the diode D70 applies an offset voltage and accordingly influences the detection of the envelope curve by the envelope-curve demodulator 30. This offset voltage can be dependent upon different parameters, such as the temperature or the forward current or respectively operating point of the diode.

As shown in FIG. 3, the output voltage V30 of the envelope-curve demodulator 30 is supplied to the compensation circuit 31. This compensation circuit 31 comprises an operational amplifier OV, a resistor R73 and a diode D71. The signal V30 generated by the envelope-curve demodulator 30 is supplied to the non-inverting or respectively positive input of the operational amplifier OV. The resistor R73 is arranged between the inverting or respectively negative input of the operational amplifier and ground. The diode is connected at the cathode end to the negative input of the operational amplifier OV and at the anode end to its output. The output of the operational amplifier OV corresponds at the same time to the output voltage V31 of the compensation circuit 31. The component LM258 from Texas Instruments can be used, for example, as the operational amplifier OV.

The voltage V30 reproducing the envelope curve is amplified by the operational amplifier OV so that the diode D71 becomes conducting. The current then flows through the resistor R73, so that, because of the feedback, the voltage $V_{R73}$ present in the resistor R73 corresponds to the voltage V30. The arrangement of the diode D71 between the resistor R73 and the output of the compensation circuit 31 means that the output voltage V31 can compensate the offset voltage introduced by the diode D70 as mentioned above.

In order to guarantee an optimal compensation of the offset voltage, the diodes D70, D71 used are preferably of the same type or respectively of identical construction. For example, both diodes are Schottky diodes, preferably with relatively lower forward voltage. Through the use of Schottky diodes, the efficiency of the compensation circuit 31 can be improved. Alternatively, the two diodes D70, D71 can be silicon diodes. The diodes D70, D71 are based on the same diode technology.

By preference, the diodes D70, D71 comprise the same or similar current-voltage characteristic in the pass band. By preference their current-voltage characteristics extend parallel or respectively substantially parallel to one another, at least in the pass band. These characteristics preferably comprise an identical or approximately identical gradient characteristic.

The temperature dependence of the forward voltage of both diodes D70, D71 is preferably identical or similar or respectively comparable or at least substantially comparable. In order to improve the compensation of the offset voltage, the diodes D70, D71 should preferably be closely thermally coupled. By preference, the difference between the forward voltages of both diodes D70, D71 is independent of temperature, wherein the resulting measurement error can be taken into consideration by the control unit SR in this case.

Through the configuration of the two diodes D70, D71, which are preferably identical in construction, different parameters, for example, the temperature, forward current etc. are compensated, which would otherwise falsify the measurement or respectively the detection of the envelope curve. In particular, the temperature-dependent and/or operating-point-dependent voltage error caused by the envelope-curve demodulator 30 is counteracted by means of the compensation circuit 31.

As a further measure for improving the compensation of the offset voltage, the resistors R72, R73 should comprise the same or similar resistance value.

The output V31 of the operational amplifier OV is then supplied to the input 33 of the control unit SR, which is preferably embodied as a microcontroller, preferably subject to level matching by a voltage splitter R74, R75. With this embodiment, the requirements for the detection range of the control unit SR are therefore reduced. The output-end capacitor C75 additionally serves for filtering.

The invention claimed is:

1. An operating circuit for an LED system, comprising:
    a DC voltage converter, with a controllable switch (S1) and an inductor ($L_{Buck}$) for converting an input voltage (Vin) supplied to the operating circuit into a supply voltage for the LED system;
    a control unit (SR) for controlling the switch (S1);
    a secondary-side inductor (L2) coupled to the inductor ($L_{Buck}$);
    an envelope-curve demodulator (30) for detecting the envelope curve of the voltage ($V'_{LED}$) present in the secondary-side inductor (L2); and
    a compensation circuit (31) for compensating an error relating to the detection of the envelope curve caused by the envelope-curve demodulator (30),
    wherein the envelope-curve demodulator (30) comprises a first diode (D70) for rectification of the voltage ($V'_{LED}$) present in the secondary-side inductor (L2); and the compensation circuit (31) comprises a second diode (D71) for compensation of a detection error caused by the diode (D70).

2. The operating circuit according to claim 1, wherein a temperature-dependent and/or operating-point-dependent voltage error caused by the envelope-curve demodulator (30) is counteracted by means of the compensation circuit (31).

3. The operating circuit according to claim 1, wherein both diodes (D70, D71) are arranged in such a manner that the second diode (D71) counteracts an offset voltage introduced by the first diode (D70).

4. The operating circuit according to claim 1, wherein the second diode (D71) compensates the temperature dependence of the first diode (D70), in that both diodes (D70, D71) comprise an identical or similar temperature dependence of their forward voltage.

5. The operating circuit according to claim 1, wherein the first diode (D70) and the second diode (D71) are identical in construction and are Schottky diodes.

6. The operating circuit according to claim 1, wherein the compensation circuit (31) comprises an operational amplifier (OV) at the positive input of which the output voltage (V30) of the envelope-curve demodulator (30) is present and to the negative input of which the second diode (D71) is connected.

7. The operating circuit according to claim 1, wherein the envelope-curve demodulator (30) comprises a low-pass filter (R72, C72).

8. The operating circuit according to claim 1, wherein a capacitor (C71) is connected upstream of the envelope-curve demodulator (30) in order to counteract an oscillation of the current flowing through the inductor (LBuck) caused by a resonance circuit comprising the secondary-side inductor (L2).

9. The operating circuit according to claim 1, wherein a level-matching circuit (R74, R75) is connected downstream of the compensation circuit (31).

10. The operating circuit according to claim 1, wherein the secondary-side inductor (L2), the envelope-curve demodulator (30) and the compensation circuit (31) form a sensor unit (SE) for detecting the voltage ($VL_{Buck}$) present in the inductor ($L_{Buck}$).

11. The operating circuit according to claim 1, wherein the control unit (SR) controls the switch (S1) dependent upon the envelope curve of the voltage ($V'_{LED}$) present in the secondary-side inductor (L2).

12. The operating circuit according to claim 1, wherein, starting from the envelope curve of the voltage ($V'_{LED}$) present in the secondary-side inductor (L2), the control unit (SR) infers the voltage ($V_{LED}$, $VL_{Buck}$) present in the LED system or in the inductor ($L_{Buck}$) and controls the switch (S1) accordingly.

13. A lamp comprising a lighting means, and an operating circuit according to claim 1.

14. The lamp of claim 13, wherein the lighting means is an LED system.

* * * * *